E. A. BANSCHBACH.
MULTIPLE TREAD WHEEL.
APPLICATION FILED DEC. 18, 1918.
1,381,534.
Patented June 14, 1921.
7 SHEETS—SHEET 1.
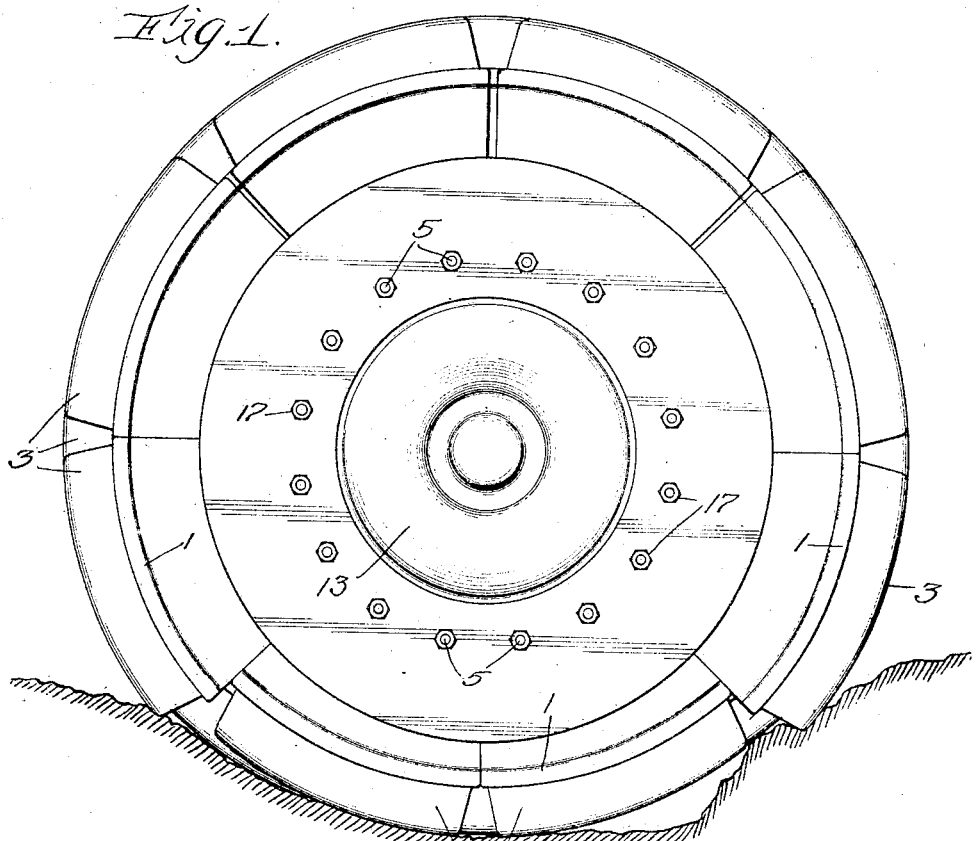
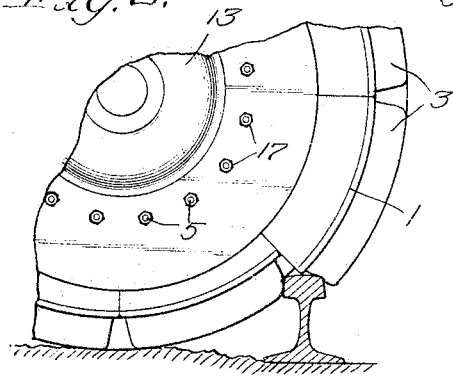
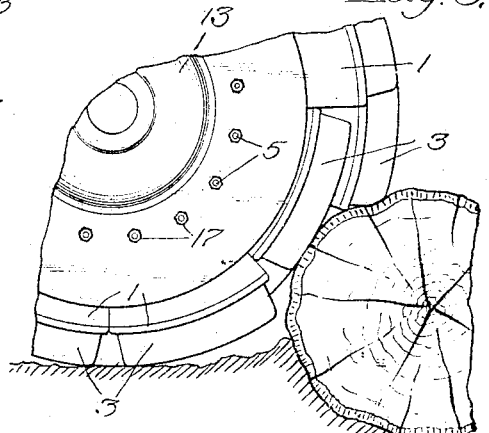
Witness:
R. L. Farrington
Inventor.
Edward A. Banschbach.
By Munn & Wiser
Attys.

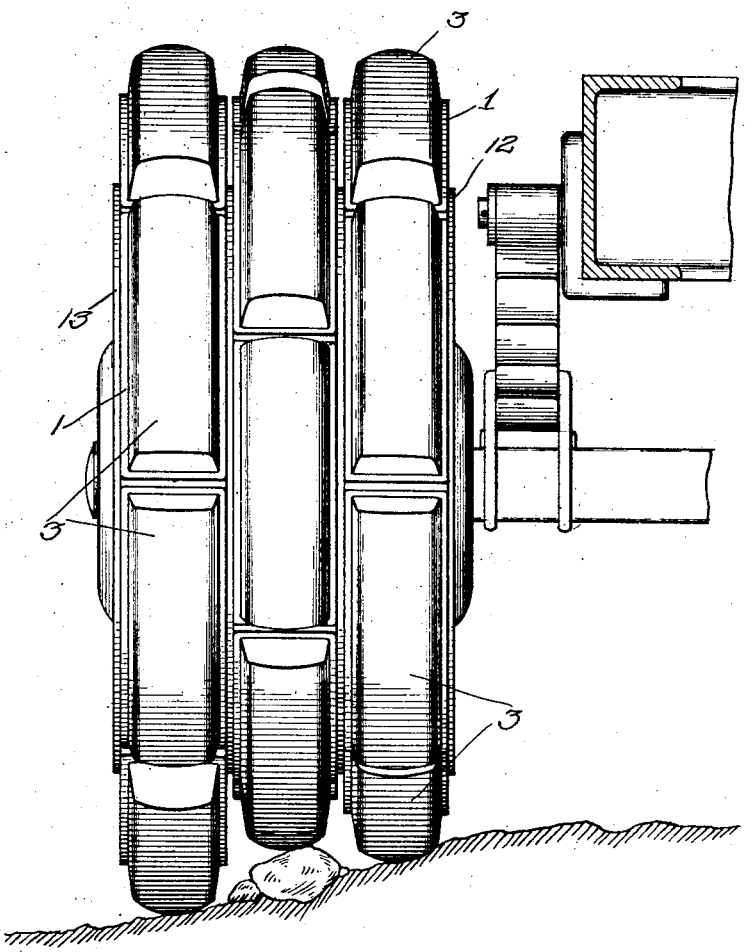
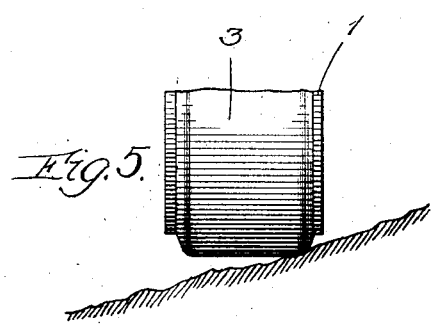
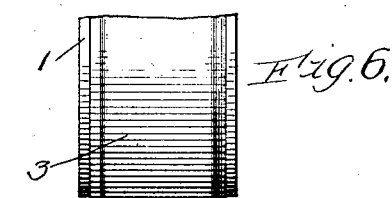

E. A. BANSCHBACH.
MULTIPLE TREAD WHEEL.
APPLICATION FILED DEC. 18, 1918.
1,381,534.
Patented June 14, 1921.
7 SHEETS—SHEET 3.
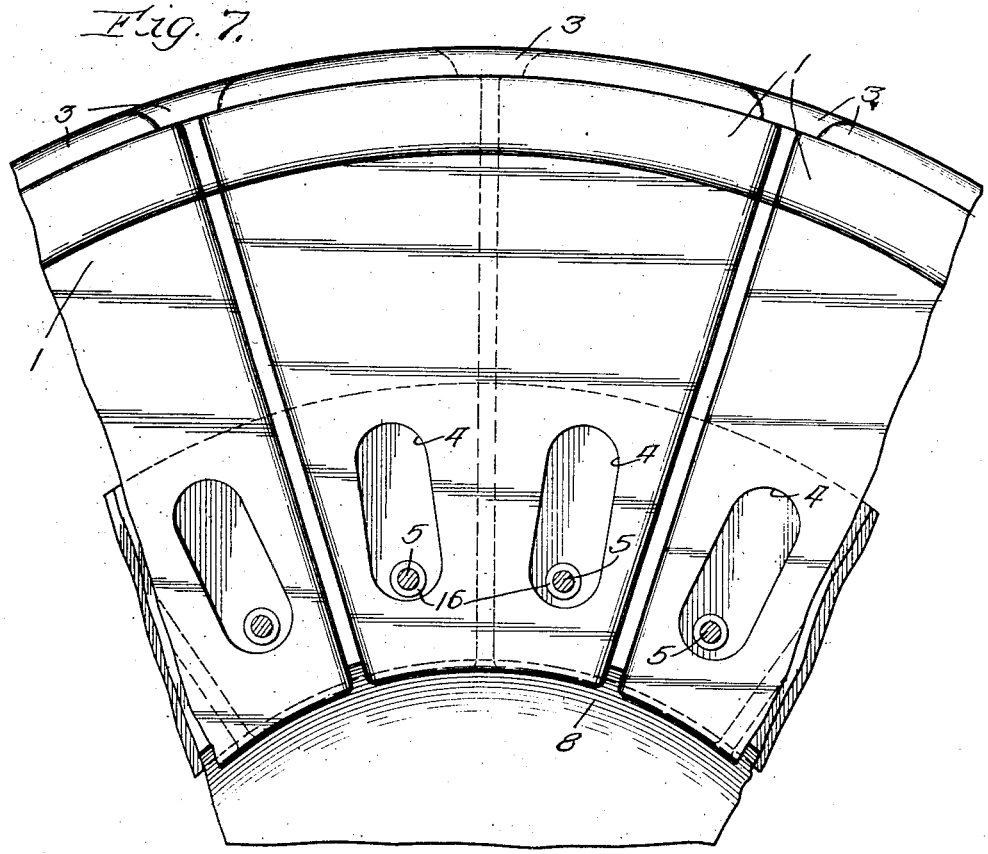
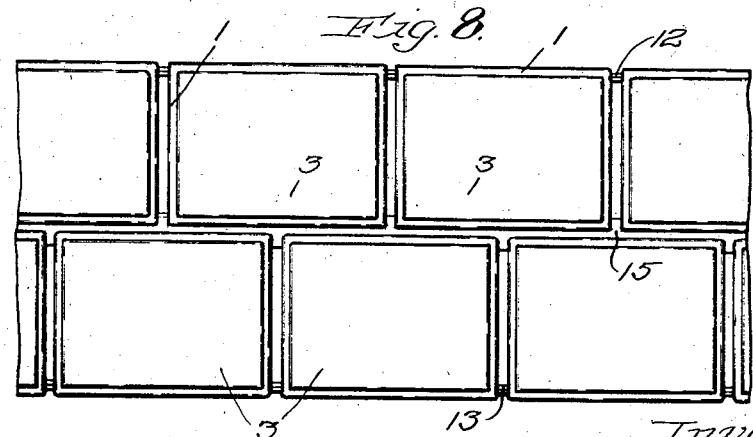

E. A. BANSCHBACH.
MULTIPLE TREAD WHEEL.
APPLICATION FILED DEC. 18, 1918.
1,381,534.
Patented June 14, 1921.
7 SHEETS—SHEET 4.
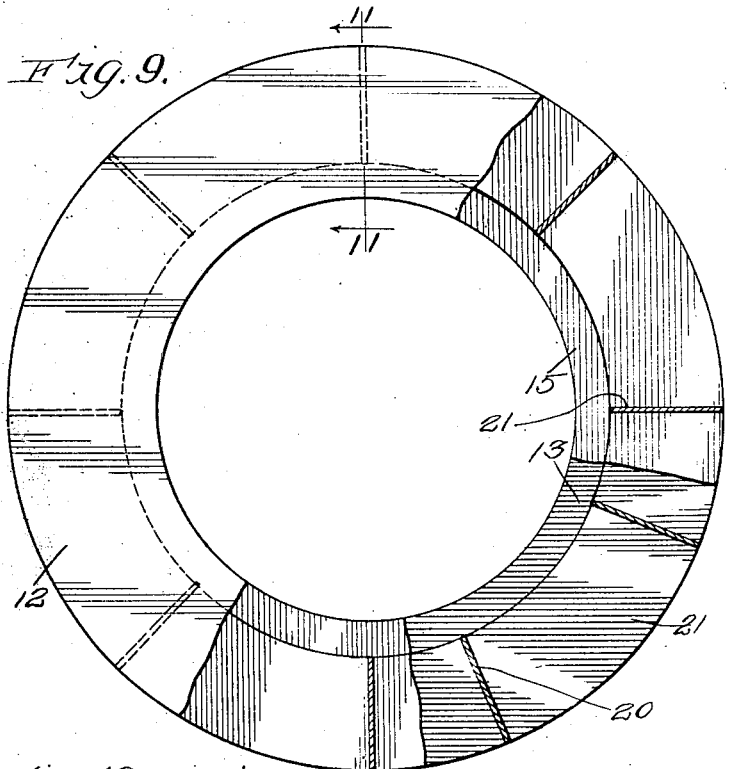
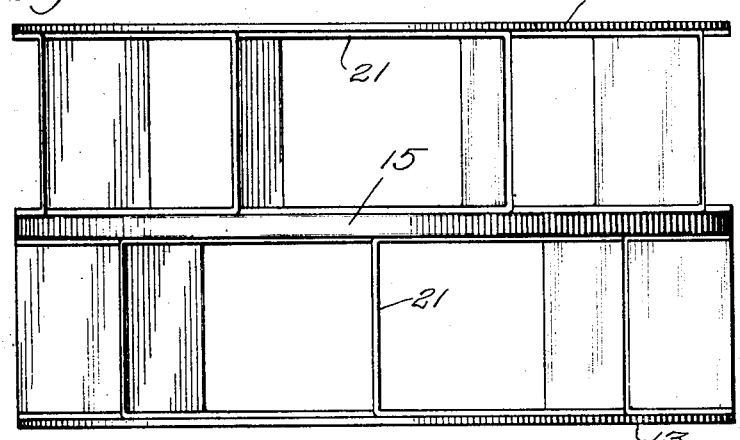
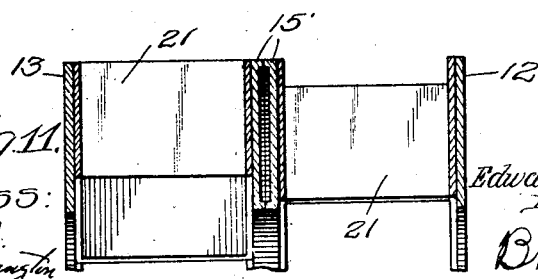
Inventor,
Edward A. Banschback,
By
Brown & Nissen
Attys.
Witness:

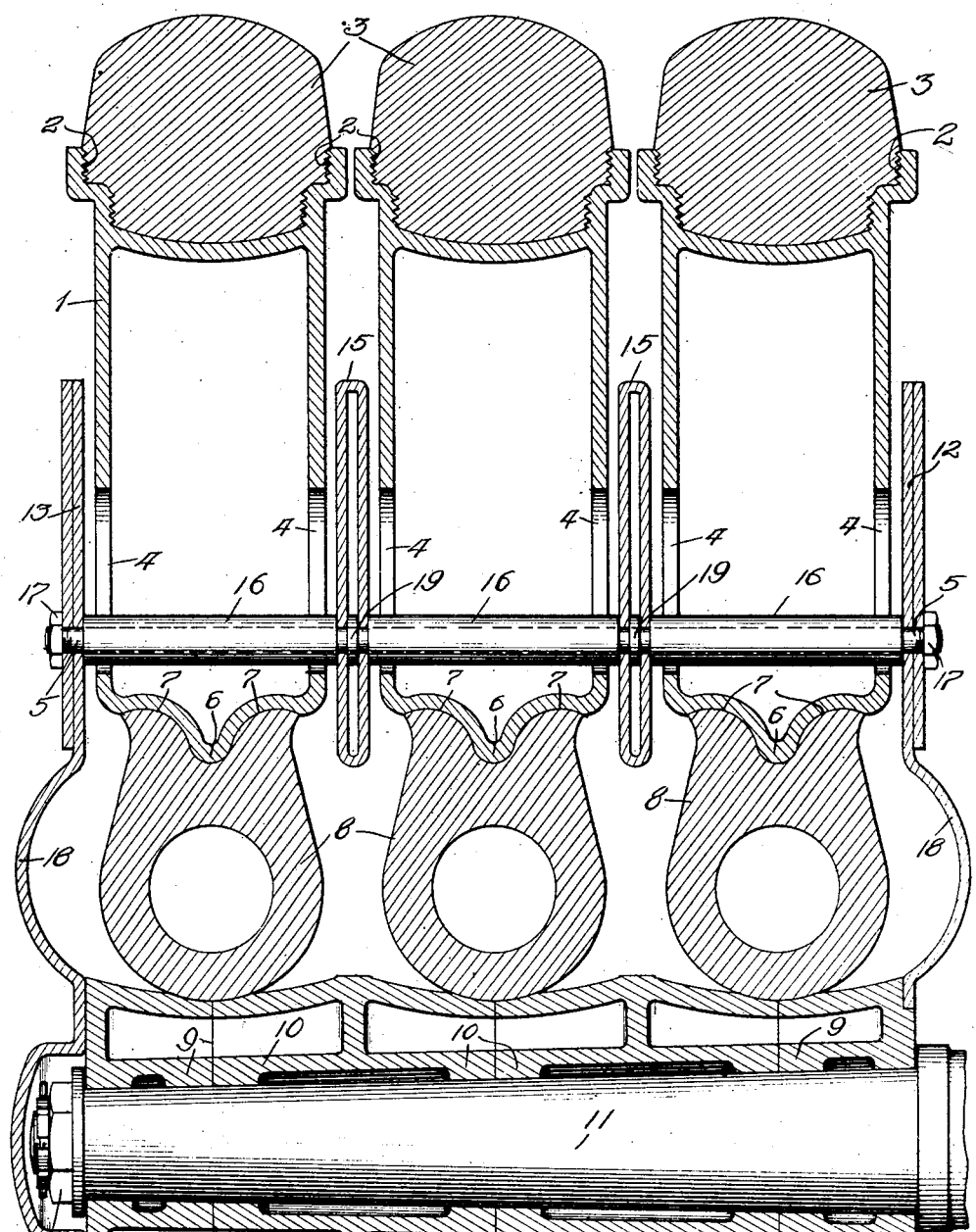

E. A. BANSCHBACH.
MULTIPLE TREAD WHEEL.
APPLICATION FILED DEC. 18, 1918.
1,381,534.
Patented June 14, 1921.
7 SHEETS—SHEET 6.
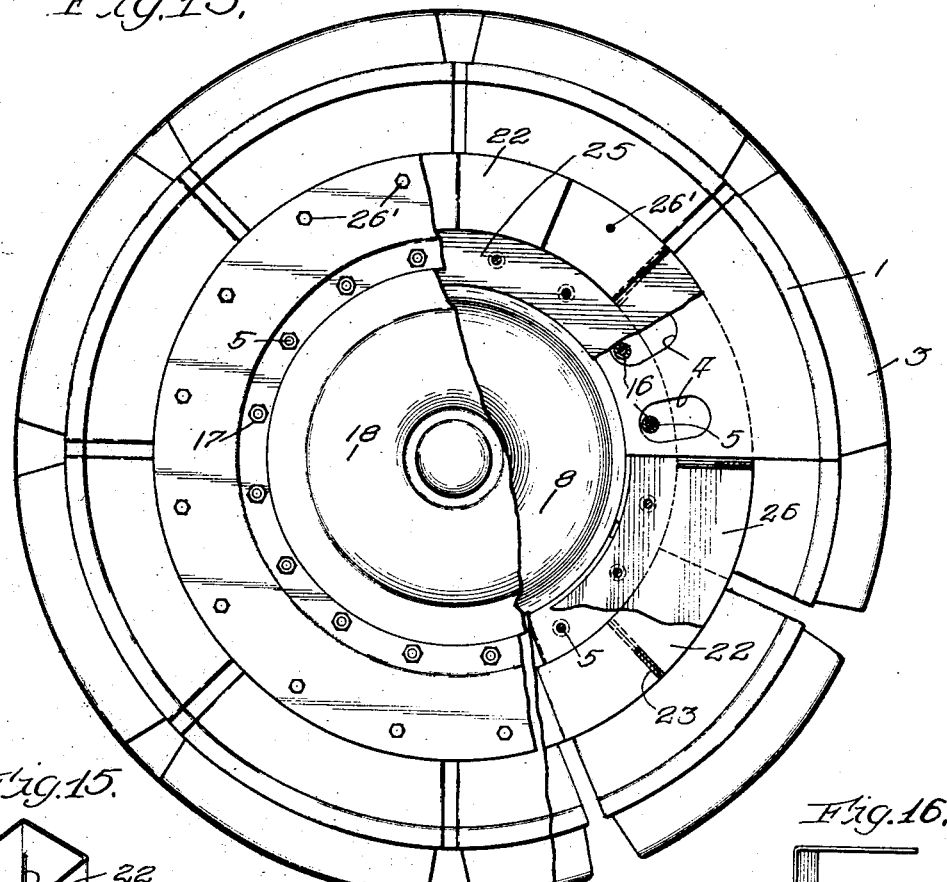
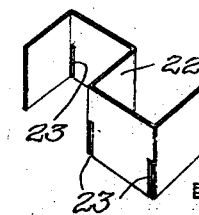
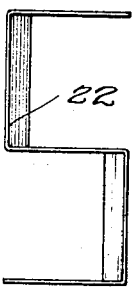
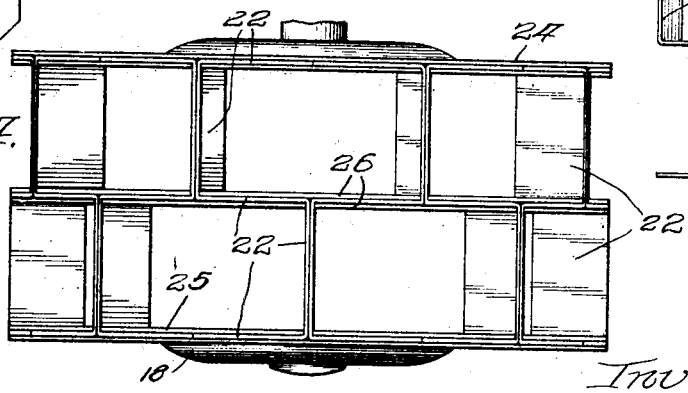
Witness:
R. L. Tarrington
Inventor,
Edward A. Banschbach.
By Brown & Nissen
Attys

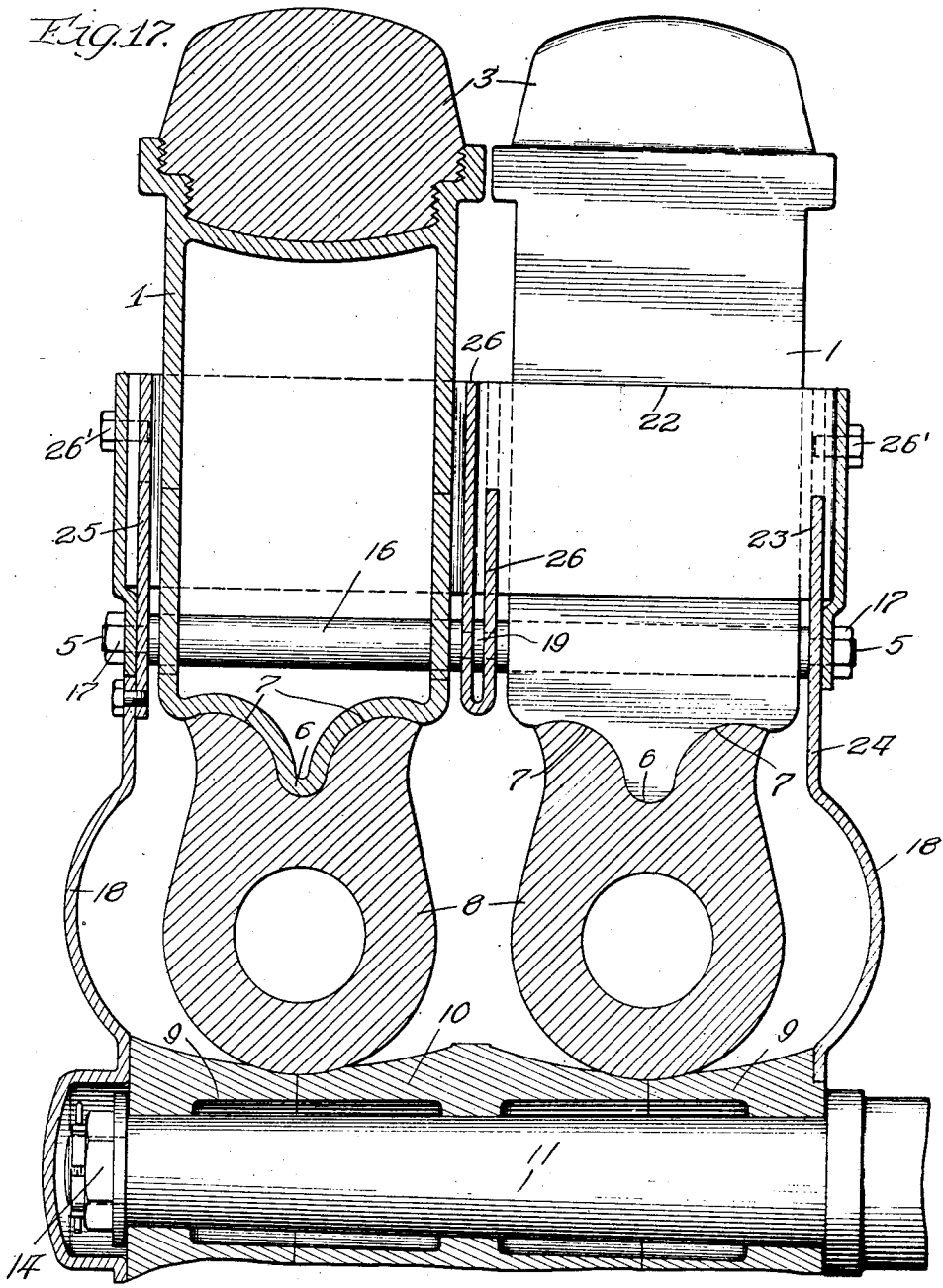

UNITED STATES PATENT OFFICE.

EDWARD A. BANSCHBACH, OF CHICAGO, ILLINOIS.

MULTIPLE-TREAD WHEEL.

1,381,534.  Specification of Letters Patent.  Patented June 14, 1921.

Application filed December 18, 1918. Serial No. 267,257.

*To all whom it may concern:*

Be it known that I, EDWARD A. BANSCHBACH, a citizen of the United States, residing at Chicago, in the county of Cook and State of Illinois, have invented certain new and useful Improvements in Multiple-Tread Wheels, of which the following is a specification.

This invention relates to wheels for motor trucks, and the like, which must sustain heavy loads, and must be suitable for heavy duty traffic, not only over rough roads, but also over smooth pavements without damaging the latter, and the principal object of the invention, therefore, is to provide a wheel of this type which is effective and efficient in operation for any class of traffic service to which it may be applied.

Another object of the invention is to provide a multiple tread wheel in which there are a plurality of staggered radially movable tread blocks separately and independently movable for accommodating the wheel to slight inequalities of the traffic surface without communicating the jolt produced thereby to other sections of the tread, or to the vehicle to which the wheel is applied.

Further objects of the invention will appear hereinafter, the invention consisting principally in the novel construction, combination and arrangement of the several parts.

In the accompanying drawings—

Figure 1 is a side elevation of a wheel constructed in accordance with the principles of the invention conforming to an inequality of the traffic surface.

Fig. 2 illustrates such a wheel in contact with a railroad rail.

Fig. 3 illustrates the wheel in contact with a log, or the like.

Fig. 4 is a view in elevation of a triple tread wheel.

Figs. 5 and 6 illustrate the application of a single tread of a wheel of this class to irregularities in the supporting surface.

Fig. 7 is a fragamentary side elevation of a portion of a wheel showing a radially movable block of a wheel of this class in its relation to the associated parts.

Fig. 8 illustrates the staggered relation of the blocks of a duplex tread.

Fig. 9 is a view partly in section of a casing for a duplex tread wheel.

Fig. 10 is a top view of the same.

Fig. 11 is a section taken on line 11—11 of Fig. 9.

Fig. 12 is a sectional view of a triple tread wheel constructed in accordance with the principles of this invention.

Fig. 13 is a side elevation with parts broken away of a wheel of this class with a sectional supporting casing.

Fig. 14 is a top view of the casing alone of such a wheel.

Fig. 15 is a perspective of one of the sectional casings.

Fig. 16 is another view of a section of this class; and

Fig. 17 is a sectional view of a duplex tread wheel with segments as shown in Fig. 15.

It has been found in heavy duty trucks that if the wheels are provided with separate tread blocks there is considerable jolting as the wheel passes from one block to the other. This may be overcome by staggering the blocks which form the tread so that the wheel is supported by a block in one row as it rolls from one block to another of the next adjacent row. Of course this staggering can be carried out in a multiple tread, as shown by Fig. 4, to as many different treads as desired, but the difficulty with such construction is that in adding treads side by side the width of the wheel is unduly increased. If a single tread wheel rests on an inclined surface, as shown in Fig. 5, only one edge of the wheel will be in contact with the supporting surface, and if the wheel is a multiple tread only one tread will be in contact with the surface and the wheel will in effect be a single tread wheel. This, of course, is objectionable, for the reason that there is undue wear upon the outer edges of the blocks or upon the outer treads of the wheel.

Likewise it will be found in the ordinary multiple block wheel of the fixed type that in riding over a slight inequality or bump, as illustrated in Fig. 6, the entire wheel will be raised, whereas in the applicant's construction, as shown by Fig. 4, one of the tread blocks of one of the treads may strike a considerable obstruction without in any way affecting the other treads, and thus without reducing the traction which they produce. This same figure illustrates the advantage of having movable tread blocks which will conform to an uneven supporting surface transversely of the wheel, for in the case of the radially movable tread blocks, the contact of the various treads will be divided in proportion to the inclination of the surface upon which the wheel rests, rather than passing all of the weight upon the inside or outside of the wheel, whichever the case may be.

Referring now more particularly to the applicant's construction, as shown by Fig. 12, a plurality of radially movable tread blocks 1 are arranged side by side in staggered relation, as shown for example by Fig. 4, and each block, preferably formed of metal, is provided at its outer end with a serrated recess 2 in which an outer block 3 is held. This block preferably consists of rubber, or some suitable composition of a more or less resilient nature which is less destructive to streets and pavements than a metal contact surface. The body of each block 1 is preferably hollow to reduce the weight and is formed with opposite slots 4 which extend radially and through which the supporting bolts 5 extend loosely for retaining the blocks 1 in place. The inner end of each block is preferably formed with a central tip 6 with surfaces 7 rounded outwardly therefrom, and conforming to this tip and the rounded surfaces 7 is a resilient member 8 which may be a tube like a tire, preferably with heavy or thick walls, the inner periphery of which is supported by bearing members 9 and 10 which are mounted on a wheel axle 11. These supporting members 9 and 10 are preferably split at the central point of contact of the resilient member 8 so that by removing the outermost supporting member 9 or 10, the tubes 8 can also be removed successively. It will be observed that the contact of each resilient member 8 with the rounded surfaces 7 of the radially movable blocks tends to center the latter with respect to the resilient members 8, and even if the blocks are tilted or inclined laterally, the tendency of the resilient member is to return them to their central position and to hold them in this position as the members 8 are, of course, composed of rubber, or some similar resilient composition.

In order to properly support and space the series of tread blocks apart, each wheel is provided with an inner supporting plate 12 in the form of a ring, preferably resting upon the inner supporting member 9, and an outer supporting plate 13, preferably in the form of a disk which extends over the end of the axle 11, the end of the axle being provided with a nut 14 for holding the supporting members 9 and 10 in place upon it. The bolts 5 are inserted through the supporting plates 12 and 13, and between the parallel sections of the tread are ring-shaped spacing members 15 through which the bolts are also inserted. Between the spacing members 15 and the plates 12 and 13 are spacing sleeves 16 through which the bolts also extend, and at the outer ends of the bolts are nuts 17 for holding the bolts in place. It will be apparent that these spacing sleeves 16 also extend through the radial slots 4 of the various tread blocks, and as shown in Fig. 7, that the sleeves fit loosely in the slots so as to permit considerable play of each block in its radial movement.

It will be observed that the spacing rings 15 terminate at some distance from the axis of the wheel and that the plates 12 and 13 are formed with outwardly bulging portions 18 opposite the resilient members 8 so that when any one of the blocks 1 is forced inwardly to compress the resilient member 8 there will be sufficient space to allow each member to flatten out, thereby increasing the contact surface of each resilient member as the load is applied, the contact surface formed by the supporting members 9 and 10 and the plates 12 and 13 being rounded so as to conform to the outer surface of the resilient members 8. Likewise there is sufficient space between adjacent resilient members 8 so that they will not engage or abrade each other. The bolts 5 are sufficient in number to properly support the partitions 15 even though they do not extend inwardly to the supporting members around the hub, and this leaves space for the resilient members 8 to spread outwardly under compression. If necessary, an additional spacing member 19 may be inserted between the walls of the spacing members or partitions 15, particularly when they are made sectional in form, as indicated at 15' in Fig. 11.

In order to properly space the tread blocks apart and to form a solid wheel structure, the spacing members 15 or 15' are preferably connected by cross-pieces 20, as shown by Fig. 9, or separate U-shaped sections 21 may be secured to the side plates 12 and 13, as indicated by Fig. 10, or these sections 21 may be secured to both the side plates 12 and 13, and to the partition 15', as indicated in Fig. 11.

Another modification of the block supporting structure is more clearly shown in Figs. 13 to 17 in which S-shaped sections 22 formed with slits 23, as shown more clearly by Fig. 15, are attached to the intermediate partitions and the outer side plates. In this construction there is an inner supporting plate 24, an outer supporting plate 25, and an intermediate partition 26, all of which are provided with slits which coöperate with the slits 23 of the sectional members 22, so that these members 22 can be placed transversely of the wheel to form partitions in the block-receiving openings in the adjacent parallel treads of the wheel, as shown more clearly in Fig. 14. In this construction it will be seen that one end of the section 22 extends on the outside of the plate 24, the intermediate portion of the section 22 is seated between the sides of the central supporting member or partition 26, and the other end of the section 22 extends over and on the outside of the outer slit plate 25. Of course these sections 22 are rigidly secured to the outer plates 24 and 25 by bolts 26', or other suitable fastening means which makes the wheel structure rigid and substantial.

With this construction it is obvious that each of the separate tread blocks is radially movable so that the wheel as a whole will readily accommodate itself to inequalities of the ground and without communicating the jolt imparted by such inequalities to the vehicle which supports the wheel. Even when passing over an obstruction, such as a rail, as shown by Fig. 2, the wheel will be so cushioned as to communicate very little jolting or jarring to the vehicle, and by having the tread blocks separately movable a greater tractive effort is exerted in passing not only over small inequalities of the ground, but also in passing over larger ones, such as a stump or log, as illustrated in Fig. 3, for in such a case the blocks of a multiple tread wheel will readily and separately conform to the inequalities of the application thus encountered so that a better grip is obtained by the wheel than would be possible with a fixed block type of wheel which does not have radially movable segments.

One of the principal objects of the present invention is to provide a wheel of this class which can be readily taken apart for repair, or for substituting new elements, such for example as new tread blocks, as it frequently happens in practice that one block may be badly damaged without any material damage to the others. In such a case the wheel pounds along on the damaged block, thereby damaging pavements, and even injuring the wheel itself by the continued pounding. With the present construction the damaged block can be quickly replaced by a new one and the wheel is as good as new. It will be observed, furthermore, that there are long parallel supporting sides for each block so that even in skidding or any side thrust upon the wheel, the contact surface of the blocks with the supporting plates and partitions is so great that little damage can be done to the wheel. Furthermore, the blocks do not fit tightly between the side plates and partitions, and any dirt or foreign material which gets in the interior of the wheel is as rapidly ejected therefrom as it falls through these spaces at the sides of the blocks due to the rotation of the wheel. In fact the radial movement of the blocks at times assists in the expelling action, and additional holes may be provided, if desired, in the outside plates to insure a circulation of air in the common chamber containing the resilient members 8 so that they may be thoroughly aerated.

I claim:

1. In a multiple tread wheel, a plurality of parallel treads each composed of radially movable blocks, the blocks of one tread being arranged in staggered relation to the blocks of another tread, supporting means at the out sides and between the parallel treads, and tie-bolts extending loosely through the blocks and fixed in place by the supporting means at the out sides of the treads and also holding the intermediate supporting means in proper position.

2. In a multiple tread wheel, a plurality of parallel treads each composed of radially movable blocks, outer supporting plates and a separating member between the parallel treads, and resilient means for each set of parallel tread blocks for pressing the blocks outwardly, the inner edge of the separating member terminating at a distance from the axis of the wheel to provide space for the compression of each of the resilient means.

3. In a multiple tread wheel, a plurality of parallel treads each comprising radially movable tread blocks, a resilient compressible member for each of the parallel treads, and means between the parallel treads to guide and separate the blocks of adjacent treads, said guiding and separating means being arranged to terminate inwardly at a distance from the axis of the wheel to provide a common space for the compression of the said resilient members.

4. In a multiple tread wheel, a plurality of parallel treads each comprising radially movable blocks, supporting members forming the hub of the wheel, a compressible resilient member interposed between the hub of the wheel and the inner edges of the blocks of each parallel tread, and means to limit the movement of the blocks to a substantially radial direction, said means being positioned to permit of a common space in which the resilient members are compressible.

5. In a multiple tread wheel, a plurality of parallel treads each comprising radially movable blocks, a compressible resilient member engaging the inner periphery of the blocks of each tread tending to force them outwardly, supporting means at the hub of the wheel for the said resilient member, and outer confining plates for the blocks which form with the said supporting means at the hub of the wheel a continuous curved surface to which the outer resilient members conform when they are compressed by their respective blocks.

6. A multiple tread wheel comprising parallel treads each composed of radially movable blocks, means for pressing all the blocks of each parallel tread outwardly, and confining means for the blocks having compartments formed by parallel walls and radial partitions, and said compartments being open at their bottoms.

7. In a multiple tread wheel, a plurality of parallel treads each composed of radially movable blocks, means for pressing the blocks of each tread outwardly, and a rigid supporting frame for the blocks having transverse partitions and parallel partitions forming radially extending chambers open at both the inner and outer sides for containing the blocks and for holding the blocks of one tread in staggered relation to the blocks of the adjacent tread.

8. In a multiple tread wheel, a central support, resilient compressible means surrounding the support, a plurality of parallel treads each comprising radially movable blocks, one of the resilient means pressing the blocks of each tread outwardly, means for confining the blocks of each tread to a substantially radial and parallel movement, the portion of the confining means between the blocks of parallel treads terminating at a distance from the central supporting member so as to leave a space to provide for the lateral expansion of the said resilient means under the compression due to a load on one or more of the blocks.

9. In a multiple tread wheel, a plurality of parallel treads each comprising radially movable blocks and a single resilient member tending to press the blocks of each tread outwardly, and means for spacing the blocks of parallel treads apart, said means comprising ring-shaped partitions between the blocks of parallel treads, supporting means therefor comprising bolts extending through the said blocks with spacing sleeves surrounding the bolts between the partitions, and outer rigid plates to which the outer ends of the bolts are attached, the said sleeves holding the partitions in place.

10. In a multiple tread wheel, parallel treads each comprising a plurality of radially movable blocks having radial slots extending transversely therethrough, resilient means for pressing the blocks of each tread outwardly, guiding and spacing means for the blocks comprising partitions between the parallel treads and outer supporting plates, bolts attached to the outer plates and extending loosely through the slots of the blocks and tightly through the partitions between the blocks of parallel treads, and spacing sleeves surrounding each bolt between the said spacing partitions and between the partitions and the outer plates.

11. A multiple tread wheel comprising a hub, a plurality of resilient members surrounding said hub and arranged side by side thereon, a plurality of radially movable tread members supported by each of said resilient members, the tread members on each resilient member forming one of the treads of said wheel, and means for separating the radially movable members of one tread from those of another tread, said separating means being spaced outwardly from said hub to leave an undivided chamber adjacent said hub for said resilient members.

12. A multiple tread wheel comprising a hub, side plates extending radially from said hub to form a circumferential channel about said hub, a partition for dividing the outer portion of said channel into smaller circumferentially extending channel portions, partitions extending transversely of said circumferential channel portions to divide said channel portions into radially extending cells, and radially movable tread members located in said cells.

13. A wheel comprising a hub having side plates secured thereto to form a circumferential channel about said hub, and partitions arranged to divide said channel into radially extending cells, each partition having a portion thereof arranged to extend transversely of said channel and a different portion thereof arranged to extend circumferentially about said wheel in the direction of said channel.

14. A wheel comprising a hub, side plates on said hub arranged to form a circumferential channel about said hub, a plurality of partition plates for said channel, each plate having a portion thereof arranged to extend transversely of said channel and a different portion arranged to extend circumferentially about said wheel in the direction of said channel, said partition plates being connected with said side plates to separate said channel into a plurality of radially extending cells, the cells being arranged in circumferential rows with the cells of adjacent rows in staggered relation to one another.

15. A wheel comprising a hub having side plates thereon to form a circumferential channel about said hub, and a plurality of partition plates interposed between said side plates to divide said channel into radially extending cells arranged in circumferential rows with the cells of adjacent rows in staggered relation to one another, each of said partition plates being common to a plurality of circumferential rows of cells and being bent to conform to the staggered relation of the cells of adjacent rows.

16. A wheel comprising a hub having side plates thereon and spaced apart to form a circumferential channel about said hub, partition plates arranged to divide said channel into radially extending cells, said partition plates having slots therein to permit said plates to interfit with one another, and radially movable tread members arranged within said cells.

17. A wheel comprising a hub having side plates thereon and spaced apart to form a circumferential channel about said hub, partition plates interposed between said side plates and spaced outwardly from said hub to leave a continuous chamber between the inner edges of said partition plates and said hub, said partition plates being arranged to divide the outer portion of said channel into a plurality of circumferential rows of radially extending cells, the cells of each row being staggered with relation to the cells of the next adjacent row, radially movable tread members in said cells, and resilient members supported by said hub within said chamber and arranged to bear against the inner ends of said radially movable tread members, there being one resilient member for each circumferential row of cells and common to all of the tread members of said row.

In testimony whereof I have signed my name to this specification on this 9th day of December, A. D. 1918.

EDWARD A. BANSCHBACH.